April 13, 1965 W. McK. MARTIN 3,178,066
SOLIDS METERING AND FEEDING DEVICE
Filed Jan. 27, 1964 4 Sheets-Sheet 1

INVENTOR.
WILLIAM McK. MARTIN
BY
ATTORNEY

INVENTOR.
WILLIAM McK. MARTIN
BY
ATTORNEY

April 13, 1965     W. McK. MARTIN     3,178,066
SOLIDS METERING AND FEEDING DEVICE
Filed Jan. 27, 1964     4 Sheets-Sheet 3
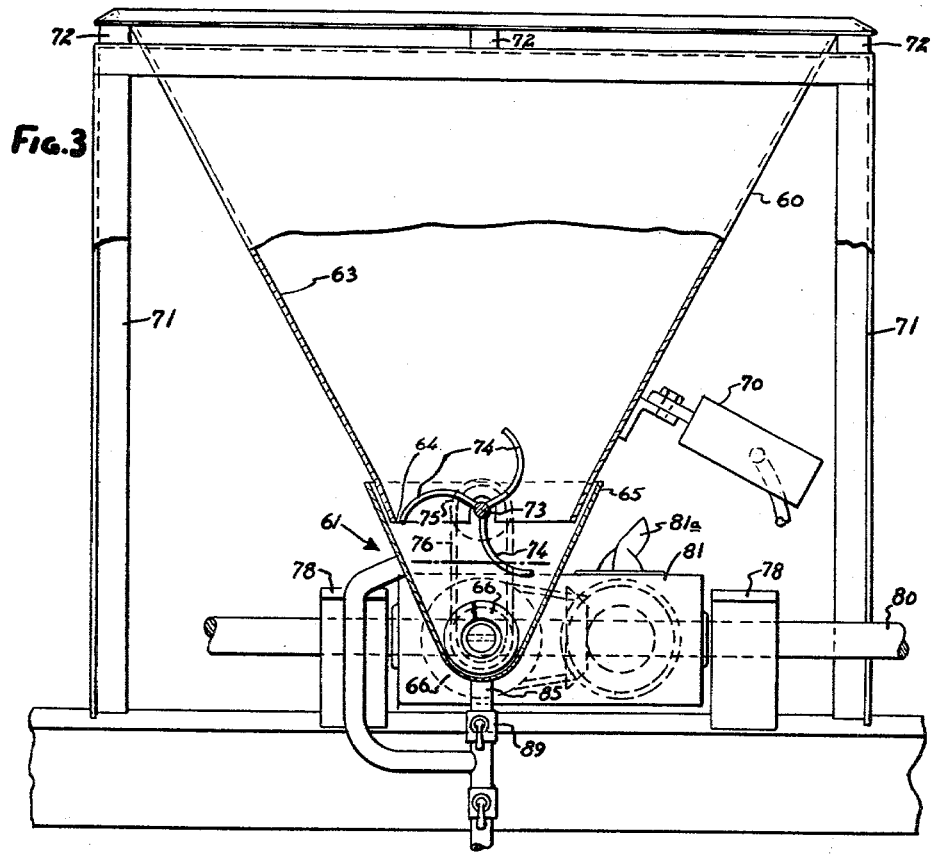
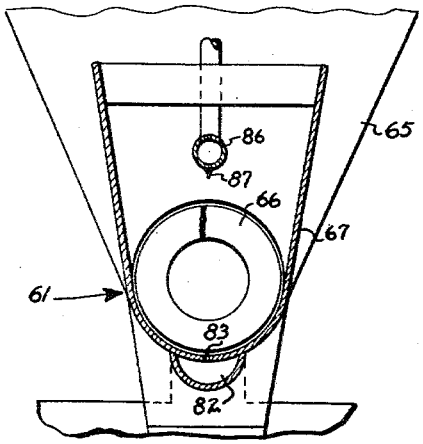
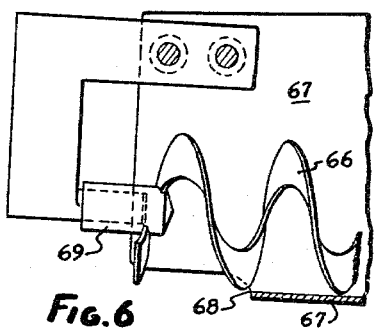
INVENTOR.
WILLIAM McK. MARTIN
ATTORNEY

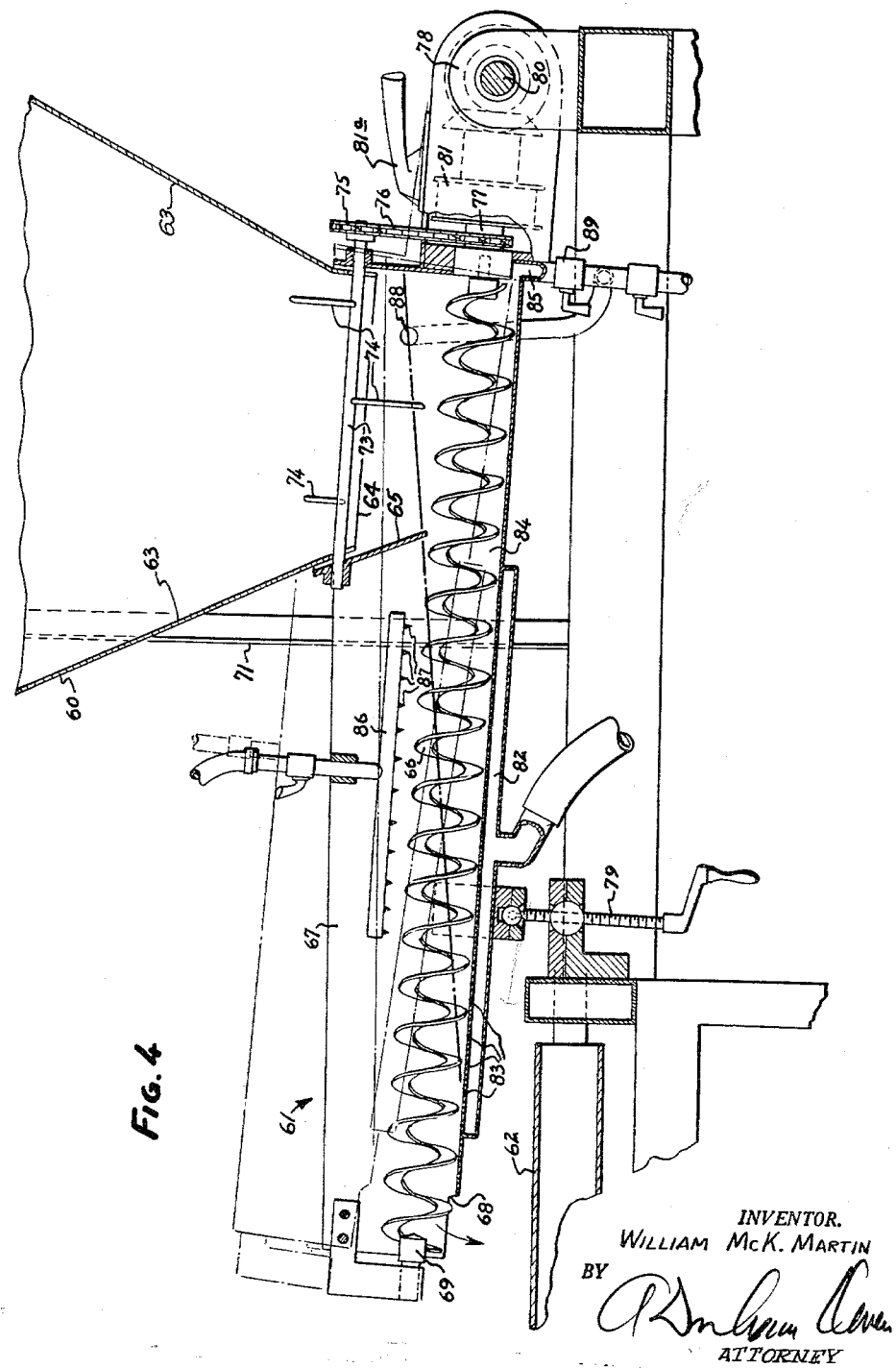

United States Patent Office 3,178,066
Patented Apr. 13, 1965

3,178,066
SOLIDS METERING AND FEEDING DEVICE
William McK. Martin, 457 Virginia Ave.,
San Mateo, Calif.
Filed Jan. 27, 1964, Ser. No. 340,415
8 Claims. (Cl. 222—142)

This invention relates to an improved method and improved apparatus for metering and blanching sizable particles of food and to an improved apparatus for mixing the solid components with metered amounts of a liquid foodstuff.

This application is a continuation-in-part of my application Serial No. 108,697, filed March 30, 1961, now abandoned which was a division of my application Serial No. 845,744, filed October 12, 1959 (now U.S. Patent No. 3,041,185), which was a continuation-in-part of my application Serial No. 759,098, filed September 4, 1958, now abandoned, which was a continuation-in-part of my application Serial No. 546,306, filed November 14, 1955, now abandoned.

A very important object of the present invention is to prevent disintegration, attrition, and mushing of the solid components in the food product while assuring their accurate measurement and their blanching.

Another important object of the invention is to provide for the continuous production of canned fluid or semi-fluid food products containing solid pieces and having better flavor, color, texture, and uniformity than can be produced by conventional canning methods. The invention can also be used to produce semiliquid or liqui-form canned products of improved quality.

Although the apparatus and methods of this invention will be described in connection with an aseptic canning system, many features are useful elsewhere in other food and chemical processing systems; so the invention is not to be interpreted as confined too narrowly.

*Metering and blanching of solid particles*

When aseptically canning a mixture comprising a liquid phase and a solid phase, special problems arise. One of these is the difficulty of properly metering the solids into the liquid. Usually several solid ingredients, as for example potatoes, peas, celery, carrots, and beef may all be added in chunks to the same soup. There is, then, the problem of maintaining the correct relative proportions among these ingredients.

Also, it is conventional to blanch or pre-cook solid ingredients before putting them into the liquid mix, and this has to be done in a way that will not result in either overcooking or underblanching.

Further, blanching usually results in sending some steam up into the hopper from which the solid foods are being fed into the blanching device and into the metering device. This has tended to cause the solid particles to become sticky and to make flow down the hopper walls even more difficult than usual. I have found that under such conditions even raw diced carrots, potatoes, and celery sometimes tend to bank up and bridge across the hopper above the feed screw, so that the screw would then seem empty even though the hopper was full of material. Such materials as lasagne tend, under such conditions, to become a single solid mass that heretofore could no longer be fed from the hopper into the metering device. Vibration alone failed to solve this problem as did ordinary disbridging devices.

The solution of these problems is among the objects of the present invention.

Other objects and advantages of the invention will appear from the following description of a preferred embodiment and of some modifications.

*Broad consideration of the present invention*

The present invention embodies (1) precooking or blanching each of the solid food constituents with both the temperature and time of treatment automatically controlled, and (2) metering each of the precooked or blanched solid constituents into the liquid phase of the product in the desired amounts and proportions, while (3) preventing bridging of the food in the hoppers which feed the precooking or blanching and metering devices.

In the drawings:

FIG. 3 is a further enlarged view in elevation and partly in section taken along the line 3—3 in FIG. 2.

FIG. 4 is a view in elevation and in section on the scale of FIG. 3 of a portion of the solids-metering and blanching apparatus of FIG. 2.

FIG. 5 is a still further enlarged fragmentary view in elevation and in section, taken along the line 5—5 in FIG. 2.

FIG. 6 is a fragmentary view in elevation and in section of an end portion of the feed screw used in the solids-metering and blanching apparatus.

*General outline of the aseptic canning system portions pertinent to the invention*

Figure 1:
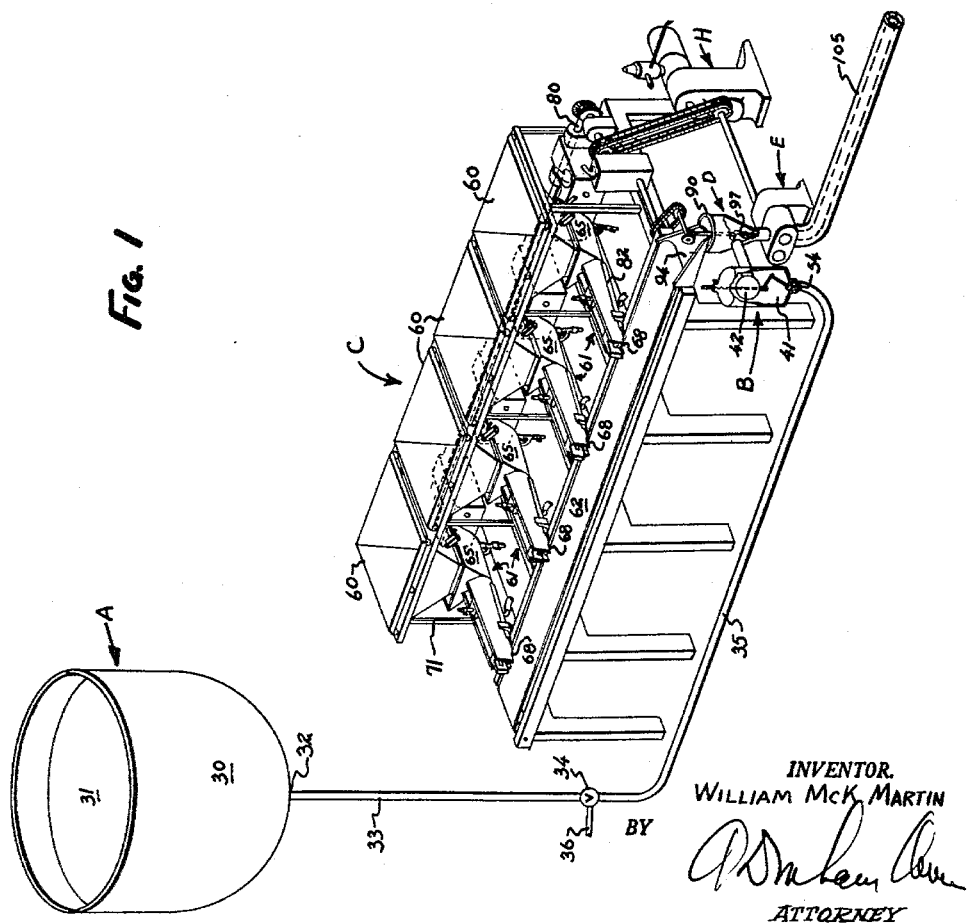
FIG. 1 is an isometric and partly diagrammatic view of a portion of an aseptic canning apparatus embodying the principles of the invention. Some parts are broken away and shown in section, to disclose other parts.

A liquid-supply unit A (FIG. 1) feeds the liquid phase of a product to be canned to a liquid-metering unit B. Meanwhile, a solids supply, metering, and blanching unit C feeds various measured amounts of particulate or solid components into a mixing device D, where the solids are added to and mixed with the liquid. From there, the mixture is forced by a pump E through the remainder of the system.

*The liquid supply unit A (FIG. 1)*

The liquid supply unit A may comprise a steam-jacketed kettle 30 which contains a liquid food component 31. The steam-jacketed kettle 30 may preheat or even pre-cook the liquid 31 to any desired temperature, usually below 212° F. For that matter, for some uses the liquid 31 may be at the ambient temperature in an unjacketed supply tank. An outlet 32 at the lower end of the kettle 30 may lead into a vertical pipe 33, for gravity supply is desirable in the steps preceding the pump E. However, a pump may be used here in connection with a recirculating bypass, if desired. The vertical pipe 33 preferably leads through a three-way valve 34 to a pipe 35. The three-way valve 34 is used during the presterilization of the aseptic canning system, at which time the valve 34 closes off the pipe 33 from the pipe 35 and connects the pipe 35 to a water pipe 36. The purpose and operation of this feature will be explained later. At any rate, the pipe 35 leads into the liquid metering unit B.

Figure 2:
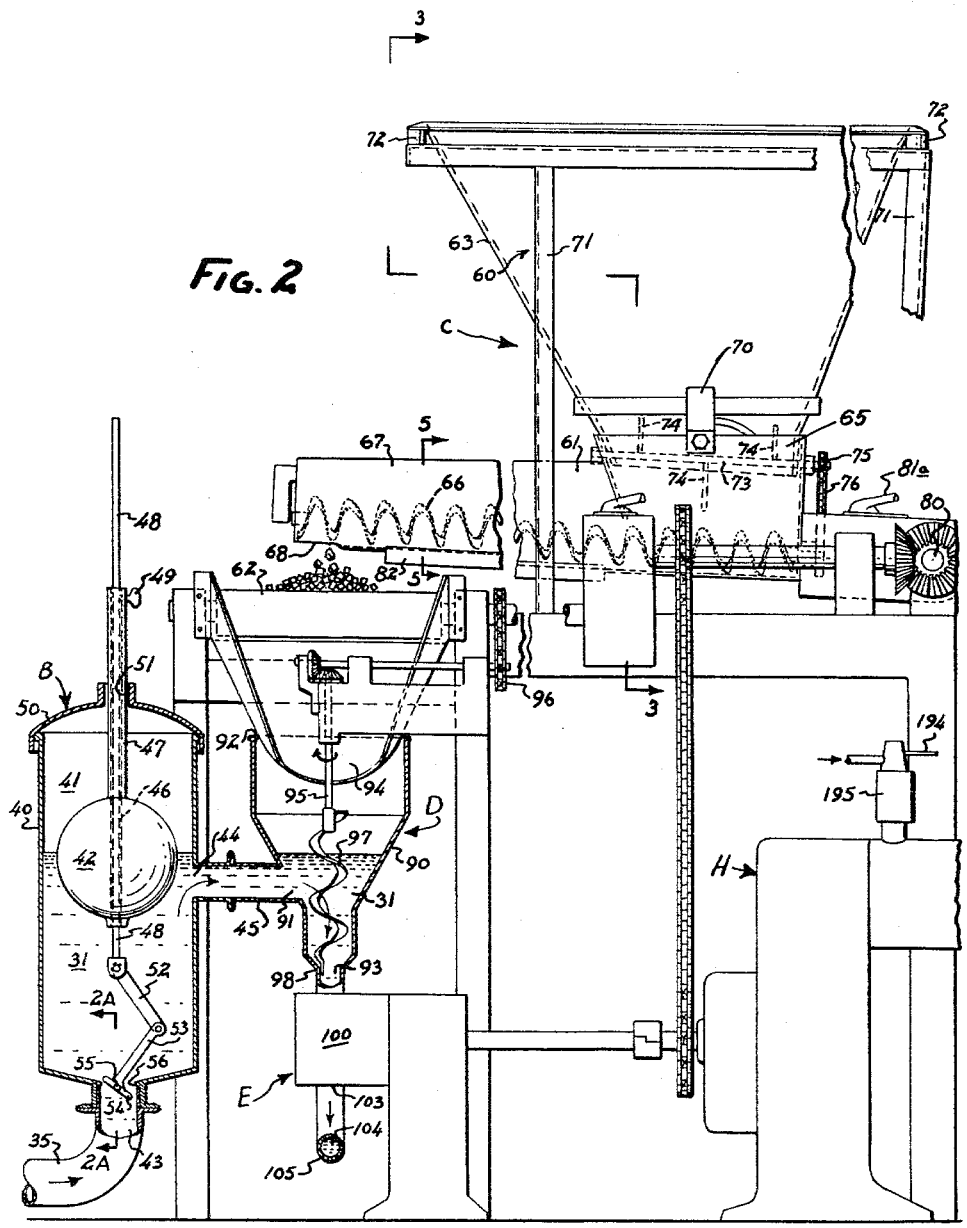
FIG. 2 is an enlarged view in elevation and partly in section of the apparatus for metering the liquid component of the food to be canned, for metering and blanching the solid components, for mixing them together and pumping them through the remainder of the system. Some parts are broken off or broken apart to conserve space.

*The liquid-metering unit B (FIG. 2)*

The liquid-metering unit B includes a generally cylindrical housing 40 providing a float chamber 41 in which is mounted a float 42. The chamber 41 has a bottom inlet 43 connected to the pipe 35 and also has a radial outlet 44 part way up one side, lower than the desired level of the liquid 31 in the chamber 41. From the outlet 44 a generally horizontal conduit 45 leads into the mixing device D. The liquid 31 will, of course, have substantially the same level in both the chamber 41 and the mixing device D. The float chamber 41 is of sufficient capacity to give an even flow of liquid through it, resulting from the gravity head of the kettle 30 (or pump pressure, if a pump is used before the unit B), and for the same reason has an adequate clearance from the float 42. In a typical apparatus the chamber 41 may be 10" in diameter and the float 7" in diameter.

The float 42 is provided with a diametral tube 46 having an extension 47, which enables the float 42 to be slidably mounted on a rod 48. A thumb screw 49 makes it possible to fasten the float 42 at any desired height on the rod 48. The housing 40 has a cover 50 with an oversize, bossed axial opening 51, that serves as a guide for the rod 48 or extension 47. There is plenty of clearance between the tube extension 47 and the opening 51, to enable the escape of any entrained air, and air can also escape from the mixing device D, which is open to the air, for in neither is pressure allowed to build up.

The lower end of the rod 48 is pivotally attached to a linkage arm 52, which in turn is pivotally connected to a second arm 53. A thin, round butterfly valve 54 is mounted on the lower end of the arm 53 and both are pivotally attached to the housing 40 by a pair of pivot pins or bearings 55, which are axially in line with the rod 48 and the opening 51. The inlet 43 is provided with a valve opening 56 in which the butterfly valve 54 moves to throttle the flow. The butterfly valve 54 is, in principle and construction, hydrostatically balanced. Hence it is easily actuated by the float 42 at all liquid levels in the kettle 30 and at all liquid pressures in the pipe 35.

As the float 42 rises, it moves the levers 52 and 53 to close the butterfly valve 54 and thereby to reduce the flow of liquid 31 past the opening 56. When the float 42 reaches a certain height, the butterfly valve 54 will close the opening 56, and the supply of liquid 31 will be practically cut off. When the liquid level drops, the float 42 opens the valve 54. The float valve 42 thus meters the flow of the liquid 31 from the kettle 30 to the mixing device D and the pump E; it prevents the mixing device D from either overflowing or running empty and assures a level that enables good mixing of the liquid with the solids coming from the unit C.

*Solids supply, metering and blanching unit C (FIGS. 1–6)*

As shown in the drawings, the metering and blanching unit C for solids includes a series of hoppers 60, one for each solid ingredient, a metering device 61 at the lower end of each hopper 60, and a single conveyor belt 62 on which all the metering devices 61 mete out their ingredients and which carries them to and dumps them into the mixing device D.

The solid constituents to be measured out may be such things as cubed or sliced vegetables (e.g., potatoes, celery, carrots, onions), whole small vegetables (e.g., beans, peas, and small onions), and meat (e.g., cubed beef or slices of ham); the cubes may be about ⅜" or ½" on a side, or whatever size one wishes them, the cutting being done in any desired manner. If desired, any of these ingredients may be precooked or sauteed. Once prepared, the solid constituents are placed into their respective hoppers 60.

Each hopper 60 is substantially identical in design and operation but there may be such variations as are desirable to accommodate different products. As shown, each hopper 60 has a sloping wall 63 and an open lower end 64 which opens into a hopper-like housing portion 65 of the metering device 60. At the bottom of each metering device 60 is a preferably hollow screw 66 which is rotated so as to move the material out of the housing portion 65 and through and along a trough 67. The trough 67 is preferably semicircular in cross-section with its sides extending a substantial distance above the screw 66 and both its sides and bottom spaced from the screw 66 enough to protect the solid components from damage. The speed of the screw 66 determines the rate at which the food particles are dispensed onto the belt 62 through an opening 68 in the outer end of the trough 67. To enable blanching, as will be explained soon, the trough 67 is preferably tilted so that the screw 66 has to carry the material upwardly out of the housing 65. Each hollow screw 66 has a stub shaft 69 at its outer end, supported in suitable bearings (see FIG. 6).

The hopper 60 is preferably equipped with a vibrator 70 of any suitable type; e.g., it may be mechanical, electrical, or pneumatic. The vibrator 70 prevents the solid constituents from sticking to the sloping walls 63 of the hopper 60. It may be aided in its function by having the hopper 60 rest on a frame 71 through flexible or rubber supports 72, and by its having its lower end 64 free to move.

Mounted immediately above the screw 66 in the housing 65 is a shaft 73 on which are mounted a series of curved rods 74. The ends of the rods or fingers 74 preferably extend as close as possible to the housing and hopper walls, while still clearing them. On a one-foot shaft 73, three or four rods 74 spaced apart and set at different rotative positions on the shaft 73 are sufficient, and too many are undesirable, acting like a paddle. When the shaft 73 is rotated, the rods 74 revolve and prevent the product from caking or lodging and from bridging over the lower end 64 of the hopper 60. Preferably, the shaft 73 is rotated slightly slower, and at least no faster, than the screw 66. This may be done by driving it through a reduction gear 75 and a chain 76 from a drive shaft 77 that drives the screw 66. Although the vibration of the sloping hoppers 60 is sufficient to cause many materials to flow freely into the metering device 61, some foods such as lasagne tend to stick together if compressed; even diced carrots, potatoes, and celery give trouble under humid conditions in the hopper; without the revolving rods 74, the hollow rotating screw 66 would tend to extrude lasagne in worm-like chunks rather than in individual pieces. Even a rotary spiral rod with a rotating off-center straight rod mounted vertically in the center of the hopper failed, tending to break up or disintegrate the solid pieces. I also found that when the hopper was full of material, it tended to bend such a stirrer and destroy its effectiveness.

The disbridging device provided by the shaft 73 and its rods 74 solves the problem. It stirs only the material immediately above the inlet to the feed screw and thereby minimizes disintegration and breaking of the food. It requires minimum power for operation and may be driven in the simple manner illustrated. Thus, many of the solid foods which are not normally free-flowing under the conditions of operation of this device, are handled safely and expeditiously. Pre-cooked lasagne noodles, macaroni and other cereal products that tend to become doughy and sticky are properly fed in by this device. Shredded savoy cabbage, spinach and other foods whose fibrous nature has heretofore made them extremely difficult to handle are properly and successfully handled by this invention.

It will be apparent from the foregoing description and from the drawings that the metering screw 66 actually measures the material and that the speed at which the screw 66 turns determines the rate at which the material is fed to the belt 62. All the screws 66 are preferably driven by the same variable-speed motor H which drives the input pump E, all the screws 66 preferably being driven from the same main drive shaft 80. In addition, each screw 66 has a separate variable transmission unit 81, with a calibrated control knob 81a for varying its individual speed. This makes it possible to adjust the metering rates of the various screws 66 relative to each other individually while at the same time driving all of them from the same motor H, whose speed is itself suitably regulated.

The conveyor belt 62 is preferably driven at a fairly high speed, so that the solid food components from the various metering units 61 are discharged in a continuous stream into the mixing device D. If the belt 62 moves too slowly, the solid components would build up and be discharged unevenly into the device D. Hence, the belt 62 moves faster than the material can be piled up on it; how much faster is not critical.

As stated earlier, the food solids are blanched or preheated as they move through the metering unit 61. For this purpose, the trough 67 in which the screw 66 moves is tilted upwardly toward its outlet 68. The amount of tilt may be adjusted by supporting the trough 67 in suitable bearings 78 on the shaft 80 and by providing an adjusting screw 79 between the trough 67 and the frame. If adjustment is not desired, a permanent tilt can be provided. Saturated steam or hot water or hot solutions of suitable composition may be used to provide the blanching heat. For this purpose, steam may be supplied to a tube 82 secured to the bottom of the trough 67, and pass into the trough 67 through openings 83. As the steam condenses in the unit 61, a hot water bath 84 may be provided, or, for a steam blanch, all the water may be drained out as it condenses through a bottom outlet 85. If desired, hot water or blanch solution may be directly added from a pipe 86 through nozzles 87 (FIG. 4), and when water or solution is used a higher outlet 88 carries off the excess above a predetermined level, a valve 89 then closing the bottom outlet 85. The blanching time used depends upon the temperature of the blanching agent, the length of the trough 67 and the speed of the screw 66. Since the temperature is never higher than 212° F., blanching time is usually not too critical, unless it lasts so long that it overcooks the food.

*The mixing device D (FIGS. 1 and 2)*

The mixing device D comprises a funnel or housing 90 having a side inlet 91 connected to the conduit 45, an open upper end 92, and a bottom outlet 93, which preferably is also the inlet to the input pump E. Solid material falls from the belt 62 directly or down a chute 94 which ends below the open top 92 of the funnel 90, and liquid passes through the conduit 45 into the inlet 91. The liquid flow rate and its level are determined by the float 42, while the solid components falling from the belt 62 are metered by the unit C.

An axial vertical shaft 95 is provided together with driving means 96, which may be, as shown, connected to the motor H, to rotate it at about 40–60 r.p.m. Too fast a speed tends to disintegrate the solids while too slow a speed provides neither adequate mixing nor adequate disbridging. On the shaft 95 is mounted a preferably hollow screw 97 having a descending helical thread terminating in a vertically downwardly extending, radially offset tip 98.

The liquid level in the mixing funnel 90 is maintained only high enough to facilitate effecting mixing of the solids with the liquid. If the level is too high above the inlet 91, the larger volume of liquid will not be as effectively stirred by the revolving screw 97. The solid components would not, in this case, be as evenly mixed with the liquid flowing through the bottom part of the mixing funnel 90. If, on the other hand, the level of liquid in the mixing funnel 90 were maintained at too low a level, there would be danger of air being drawn into the pump E along with the product mixture. The proper level has been found to be slightly above the inlet 91.

The pump E feeds the mixture 104 into the pipe 105 and on through the system to the point where the filler dispenses the mixture 104 into suitable containers.

*Operation*

In normal operation, a liquid food component 31, preheated in the kettle 30 to any desired temperature, flows by gravity through the pipe 33, the valve 34, and the pipe 35 into the housing 40. Thence it flows via the conduit 45 and funnel 90 to the pump E. The desired level is maintained by the float 42 and its action on the butterfly valve 54, which closes as the liquid level rises and opens as the liquid level drops.

Meanwhile, solids in the hopper 60, kept from sticking to the walls by the slowly rotating well-spaced pins 74, fall into the metering device 61, where the screw 66 feeds them uphill through a blanching solution or bath 84 or steam. Steam, if used, enters the trough 67 through the orifices 83 in the tube 82; while water other than that condensed from steam can enter through the tube 86 and nozzles 87. The water level is maintained by the opening 88, or if no water bath is desired, the water is drained out as it condenses through the opening 89.

The blanched solid components are metered by the screw 66, whose speed and therefore measure is determined by the speed of the motor H and by the local transmission 81 on each screw drive shaft 77. The measured solids fall through the outlet 68 onto the belt 62 and are carried to the chute 94, whence they fall into the funnel 90.

In the funnel 90, the slowly rotating hollow screw 97 mixes the liquid and solids together, and the tip 98 prevents them from bridging the pump inlet 93. The pump E, operated by the motor H, sends the mixture 104 through the pipe 105 to the remainder of the system. Variation of the speed of the motor H controls the speed of the pump E and of the metering screws 66 for the solid components of the mixture 104. Also, by the effect of the pump speed on the liquid level in the float chamber 41, the valve 54 meters the liquid component.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A solids metering device for a canning system or the like, including in combination: a conveyer belt; a series of hoppers for solid food components adjacent to said belt; a trough extending slightly uphill out of each of said hopper and having an outlet over said belt; means for maintaining blanching fluid in said trough for preventing the liquid level thereof from rising above a predetermined level lower than the outlet end of said trough; a metering screw in each said trough for feeding solid components from each hopper through the blanching fluid and out therefrom to said belt, the uphill tilt of said trough serving to separate said solid components from the blanching fluid; and means for driving each said screw.

2. The device of claim 1 in which said means for maintaining includes inlet means spaced away from said outlet and means for draining liquid from said trough adjacent the extremity of said trough farthest from said outlet, so that said blanching agent moves countercurrently to said food comopnents, thereby cleaning foreign matter from said food components, preheating them, and inactivating enzymatic activity.

3. The device of claim 1 wherein said means for maintaining includes steam inlet means along the lower wall of said trough for supplying blanching steam thereto as said blanching fluid and exhaust means further from said trough outlet than said steam inlet means for draining away the condensate resulting from said steam.

4. The device of claim 1 having a unitary main drive shaft for all said screws and individual means for varying the speed of each said screw, so as to vary the proportions of the various food components, while said unitary main drive shaft determines the total feed rate for said food components.

5. The device of claim 4 wherein all said troughs are at one end mounted rotatably on said main drive shaft, and wherein means are provided adjacent the other end of each trough for adjusting its degree of tilt and thereby affect the blanching level therein.

6. A solids metering device for a canning system or the like, including in combination: a conveyer belt; a series of hoppers for solid food components adjacent to said belt, each said hopper having downwardly converging walls; a trough having an outlet over said belt; a metering screw in each said trough for feeding solid components from each hopper to said belt; means for driving each said screw; a shaft mounted near the bottom of each hopper parallel to and above said screw; a plurality of rods, each extending from said shaft in a plane perpendicular to said shaft for a distance nearly that of the distance from said shaft to the walls of said hopper and spaced widely from each other along said shaft and distributed angularly about said shaft; and means for rotating said shaft to that said rods come close to the walls of said hopper and cause the materials in said hopper to flow freely into said trough, preventing the solid components from packing or lodging on the hopper walls, or bridging over the lower end of the hopper.

7. The device of claim 6 wherein said rods are curved in an arc presenting a convex surface to their direction of rotation with said shaft, whereby particles easily slide off said rods.

8. In a solids-metering device for an aseptic canning system or the like, the combination of: a hopper having downwardly converging walls; a trough extending out of said hopper and having an outlet at its uphill end; a hollow metering screw in said trough for feeding solid components from said hopper; means for driving said screw at a variable predetermined rate; a shaft parallel to said screw and above it; a plurality of curved rods projecting out therefrom, each in a separate plane perpendicular to the axis of said shaft, each plane being widely spaced from the other planes; and means for rotating said shaft so that said rods pass close to said hopper walls and prevent bridging over of the solid components in the lower end of the hopper.

References Cited by the Examiner
UNITED STATES PATENTS

| | | | |
|---|---|---|---|
| 1,252,613 | 1/18 | Phelps | 222—142 X |
| 1,829,479 | 10/31 | Elkins. | |
| 2,031,326 | 2/36 | Miller | 222—142 X |
| 2,568,332 | 9/51 | Genovese. | |
| 2,612,294 | 9/52 | Dorschner | 222—413 X |
| 2,982,445 | 5/61 | Koble | 222—145 X |

FOREIGN PATENTS 67,755 6/40 Czechoslovakia.

RAPHAEL M. LUPO, *Primary Examiner.*

UNITED STATES PATENT OFFICE
CERTIFICATE OF CORRECTION

Patent No. 3,178,066            April 13, 1965

William McK. Martin

It is hereby certified that error appears in the above numbered patent requiring correction and that the said Letters Patent should read as corrected below.

Column 6, line 45, strike out "of"; line 46, after "trough" insert -- and --; same column 6, line 59, for "comopnents" read -- components --; column 7, line 18, for "to that" read -- so that --.

Signed and sealed this 21st day of September 1965.

(SEAL)
Attest:

ERNEST W. SWIDER            EDWARD J. BRENNER
Attesting Officer            Commissioner of Patents